(12) United States Patent
Claus et al.

(10) Patent No.: US 11,262,261 B2
(45) Date of Patent: Mar. 1, 2022

(54) SENSOR ELEMENT WITH FASTENING SEGMENT

(71) Applicant: Carl Freudenberg KG, Weinheim (DE)

(72) Inventors: Tanja Claus, Mannheim (DE); Boris Traber, Hirschberg (DE); Stefan Sindlinger, Meinheim (DE); Olaf Nahrwold, Ludwigshafen (DE); Christian Kleinke, Darmstadt (DE)

(73) Assignee: CARL FREUDENBERG KG, Weinheim (DE)

( * ) Notice: Subject to any disclaimer, the term of this patent is extended or adjusted under 35 U.S.C. 154(b) by 112 days.

(21) Appl. No.: 16/705,400

(22) Filed: Dec. 6, 2019

(65) Prior Publication Data

US 2020/0182722 A1 Jun. 11, 2020

(30) Foreign Application Priority Data

Dec. 7, 2018 (DE) .................... 10 2018 131 357.8

(51) Int. Cl.
*G01L 9/00* (2006.01)
*G01L 9/12* (2006.01)
*G01L 19/14* (2006.01)

(52) U.S. Cl.
CPC .......... *G01L 9/0044* (2013.01); *G01L 9/0048* (2013.01)

(58) Field of Classification Search
CPC ....... G01L 9/00; G01L 9/0044; G01L 9/0048; G01L 9/12; G01L 19/14
See application file for complete search history.

(56) References Cited

U.S. PATENT DOCUMENTS

| 4,177,680 A * | 12/1979 | Coleman | G01L 9/0072 73/718 |
|---|---|---|---|
| 4,388,668 A * | 6/1983 | Bell | G01L 9/0086 361/283.4 |
| 5,235,240 A | 8/1993 | Morita et al. | |
| 7,383,737 B1 * | 6/2008 | Lin | G01L 9/0072 73/718 |
| 7,784,352 B2 * | 8/2010 | Hong | G01L 9/0072 73/718 |
| 7,802,482 B2 * | 9/2010 | Ikeda | G01L 9/0048 73/718 |
| 8,104,353 B2 * | 1/2012 | Drewes | G01L 13/025 73/718 |
| 2020/0300721 A1 * | 9/2020 | Kootaka | G01L 9/0055 |

FOREIGN PATENT DOCUMENTS

| CN | 103954394 A | 7/2014 | |
| DE | 4230031 A1 * | 3/1993 | .......... G01L 9/0072 |
| EP | 2113760 A1 | 11/2009 | |
| GB | 1355138 A | 6/1974 | |
| WO | 2017210184 A1 | 12/2017 | |

\* cited by examiner

*Primary Examiner* — Nguyen Q. Ha

(74) *Attorney, Agent, or Firm* — Leydig, Voit & Mayer, Ltd.

(57) ABSTRACT

A sensor element includes: a supporting body; and a sensor body, the sensor body being planar in shape, being made of an elastic material, and having a first surface and a second surface coated so as to be electrically conductive. The sensor body includes a measuring segment and a fastening segment. A layer thickness of the fastening segment is greater than a layer thickness of the measuring segment.

11 Claims, 3 Drawing Sheets

SENSOR ELEMENT WITH FASTENING SEGMENT

CROSS-REFERENCE TO PRIOR APPLICATION

Priority is claimed to German Patent Application No. DE 10 2018 131 357.8, filed on Dec. 7, 2018, the entire disclosure of which is hereby incorporated by reference herein.

FIELD

The invention relates to a sensor element comprising a supporting body and a sensor body, wherein the sensor body is planar in shape, wherein the sensor body is formed from an elastic material, and wherein the first surface and the second surface of the sensor body are coated so as to be electrically conductive.

BACKGROUND

From EP 2 113 760 A1, it is known to design a membrane-shaped sensor element as a pressure sensor. The sensor element thereby comprises a sensor body which is planar in segments. The sensor body is accommodated in a tubular housing, wherein the pressure of a first chamber acts upon the first surface of the sensor body and the pressure of a second chamber acts upon the second surface of the sensor body.

The sensor body thereby detects the pressure difference between the two chambers. This takes place by the sensor body deforming due to the different pressures, wherein the distance between the first surface and the second surface, thus the wall thickness of the sensor body, varies due to the elastic design of the sensor body.

The electrically conductive first surface and the electrically conductive second surface of the sensor body thereby form capacitor plates, wherein the capacitance of the capacitor that is thereby formed changes by the distance between the two surfaces changing. The pressure difference between the pressure of the first chamber adjoining the first surface and the second chamber adjoining the second surface can thereby be determined on the basis of the changing capacitance.

With such a sensor element, the electrical contacting of the two conductive surfaces of the sensor body equipped so as to be electrically conductive is in particular complicated. In addition, in the case of measurements of small pressure differences, a short distance between the two conductively equipped surfaces is required in order to obtain a meaningful measurement signal. Such sensor bodies accordingly have a particularly thin layer in the form of a thin membrane and are therefore difficult to assemble.

SUMMARY

In an embodiment, the present invention provides a sensor element, comprising: a supporting body; and a sensor body, the sensor body being planar in shape, comprising an elastic material, and having a first surface and a second surface coated so as to be electrically conductive, wherein the sensor body comprises a measuring segment and a fastening segment, and wherein a layer thickness of the fastening segment is greater than a layer thickness of the measuring segment.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
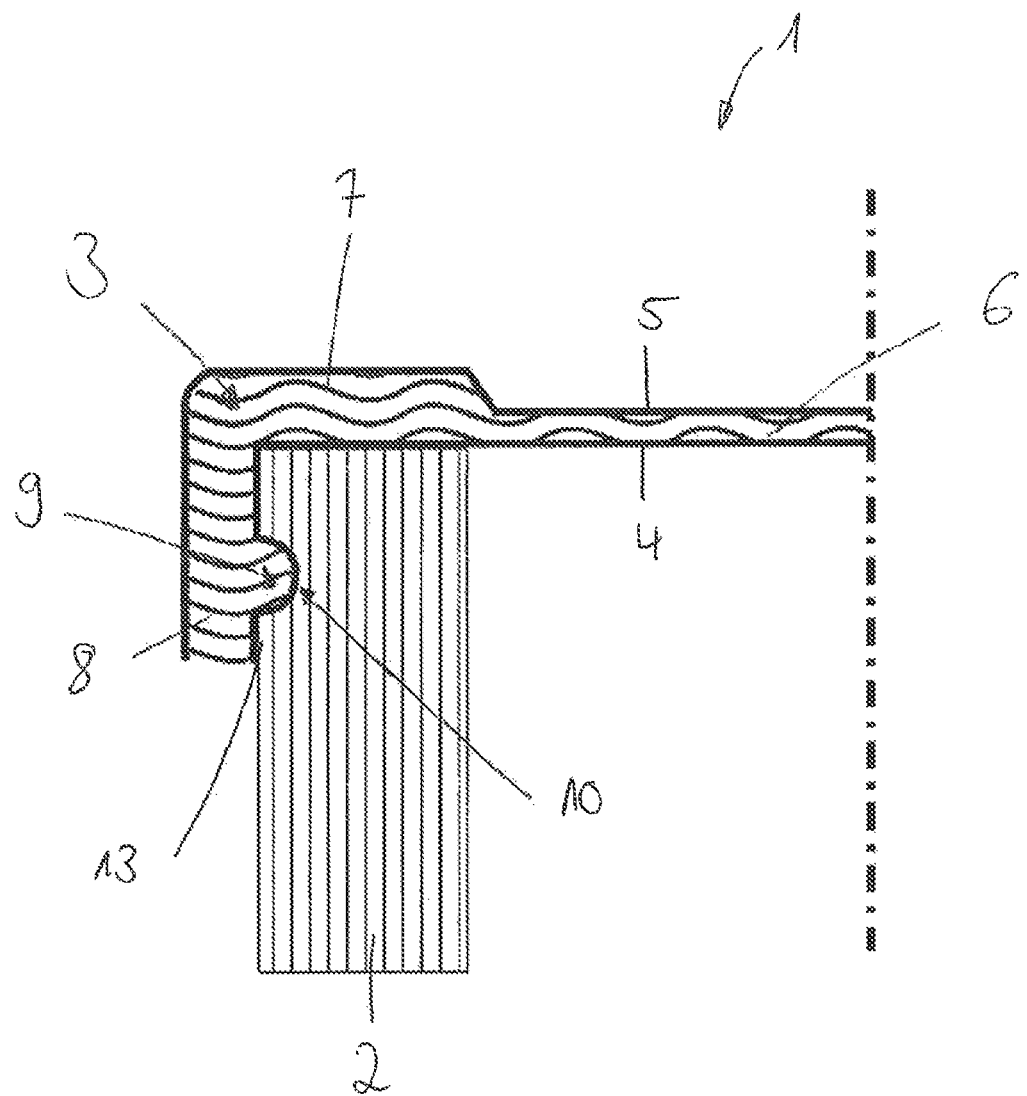
FIG. 1 a first sensor element in section.

In an embodiment, the present invention provides a sensor element which enables the measurement of small pressure differences and can thereby be assembled cost-effectively and simply.

The sensor element according to the invention comprises a supporting body and a sensor body, wherein the sensor body is of planar design, made of elastic material. The planar sensor body has two surfaces. The first surface and the second surface of the sensor body are coated so as to be electrically conductive. The two surfaces are electrically isolated from one another, i.e. are not electrically conductively connected with one another. Preferably both surfaces are coated with the same material, since this is particularly favorable in terms of production technology.

To achieve the object, the sensor body has a measuring segment and a fastening segment, wherein the layer thickness of the fastening segment is greater than the layer thickness of the measuring segment, in particular multiple times greater.

In a first, simple embodiment, the sensor body is disciform. The measuring segment is also disciform and surrounded by an annular fastening segment. Fastening segment and measuring segment are thereby materially uniform and formed as one piece from elastomer material. The layer thickness of the annular fastening segment is thereby greater than the layer thickness of the disciform measuring segment. The layer thickness thereby denotes the distance between the first surface and the second surface.

The transition between measuring segment and fastening segment may thereby take place in stages, wherein the layer thickness increases abruptly.

Starting from the measuring segment, the layer thickness preferably increases linearly up to the layer thickness of the fastening segment. An oblique transition region thereby results which forms the transition between the measuring segment and the fastening segment.

Measuring segment and fastening segment may be arranged relative to one another so that the layer thickness increases on both sides and starting from the first surface and the second surface of the measuring segment, such that the measuring segment is arranged in a centered position in the fastening segment.

Measuring segment and fastening segment are advantageously arranged along a surface in a radial plane. In this embodiment, the layer thickness of the fastening segment increases only along one surface. A sensor body having such a design can be assembled more easily.

In the case of the sensor element according to the invention, it is advantageous that the sensor body can be produced more simply since the sensor body has a fastening segment having a greater material thickness which can be demolded more easily from a production tool than the membrane-like measuring segment, which has only a thin layer thickness. Furthermore, assembly of the membrane-shaped sensor body is also simplified, since handling is simplified due to the greater material thickness of the fastening segment. Electrodes which are required for the contacting of the two electrically conductive surfaces can also be simply integrated into the region of the fastening segment.

The first surface and the second surface of the sensor body can be coated over their entire surface so as to be electrically conductive. This simplifies the contacting of the two electrically conductively equipped surfaces of the sensor body. In particular, it is thereby not necessary to introduce separate electrodes into the sensor body, for example, incorporating them by vulcanization.

The electrically conductive first surface and the electrically conductive second surface form plates of a capacitor, wherein the capacitance of the capacitor that is thereby formed substantially results from the distance between the two surfaces. The sensor element can thereby be placed in an arrangement which is designed so that the pressure of a first chamber acts on the first surface and the pressure of a second chamber acts on the second surface. If the pressure of the first chamber differs from the pressure of the second chamber, the membrane body will bulge in the direction of the chamber with lower pressure and the elastically formed sensor body thereby deform, wherein the layer thickness of the sensor body simultaneously changes due to the deformation. The distance between the first surface and the second surface thereby changes simultaneously, and the capacitance of the plate capacitor formed by the two surfaces changes. The pressure difference may thus be determined by measuring the changed capacitance of the plate capacitor.

Since the fastening segment has a greater layer thickness than the measuring segment, a significantly smaller deformation takes place in the region of the fastening segment than in the region of the measuring segment. The layer thickness of the fastening segment is preferably selected so that the fastening segment has a reduced offset capacitance. The fastening segment thereby does not affect the measurement result. The advantageous effect appears when the layer thickness of the fastening segment is at least twice as great as the layer thickness of the measuring segment. The layer thickness of the fastening segment is preferably three times the layer thickness of the measuring segment.

For the measurement of small pressure differences, it is advantageous if the layer thickness of the measuring segment is 0.3 mm to 0.8 mm, preferably 0.5 mm.

The supporting body and the sensor body may be connected with one another by positive locking. Assembly is thereby simplified, and the sensor body is securely fixed on the supporting body.

The sensor body may be disciform and have an axial flange. In this embodiment, the sensor body is designed in the form of a cap, which is associated with advantages with regard to ease of assembly and strength of the sensor body.

The supporting body may be tubular. The supporting body may thereby take the form of a pipe socket, for example. A sensor body which is disciform and has an axial flange may be mounted particularly simply on a supporting body having such a design. In this embodiment, the axial flange of the sensor body comes to rest on the outer circumference of the tubular supporting body. A positive-locking connection of the sensor body thereby results. Due to the embodiment of the sensor body made of elastic material, a firm hold on the tubular supporting body thereby already results. The sensor body thereby simultaneously acts as a sealing element and prevents a pressure equalization between first chamber and second chamber.

In the region of its fastening segment, the sensor body may have an at least partially circumferential positive-locking element on its side facing the supporting body. On its side facing the fastening segment of the sensor body, the supporting body may have a recess which is formed so as to be complementary to the positive-locking element of the sensor body. The sensor body may simply be slid onto the supporting body and be snapped in or clipped in for secure fastening by means of the positive-locking element. This enables a positive locking of the sensor body onto the supporting body.

The sensor body may be arranged between the supporting body and a closure body, wherein the closure body is annular and may have a second axial flange. A sensor element having such a design is particularly robust.

In a preferred development, contact elements for producing a signal-conducting connection of the conductive coatings to a measuring device are provided on the supporting body.

The supporting body may be provided with at least one contact element for an electrically conductive contact with the electrically conductive first surface and/or the electrically conductive second surface of the sensor body. For this purpose, the supporting body may likewise be provided with an electrically conductive coating, for example with printed conductor paths. Alternatively, the supporting body may form insert elements made of electrically conductive metallic material. These contact elements are thus arranged between the surface of the supporting body and the coating of the supporting body. When the supporting body is coated, an electrically conductive connection between contact elements and conductive coating is thus automatically achieved.

The supporting body is preferably equipped with elements for the connection of cables or cable lugs. These are in electrical contact with the at least one contact element.

The closure body may be equipped with at least one contact element for an electrically conductive contact with the electrically conductive first surface and/or the electrically conductive second surface of the sensor body. It must thereby be ensured that both an electrical contacting of the first surface and an electrical contacting of the second surface take place.

The figures show a sensor element 1 for detecting the pressure difference between two adjacent chambers. The chambers are located above and below the sensor element 1. The sensor element 1 comprises a supporting body 2 and a sensor body 3, wherein the sensor body 3 is of planar design and consists of elastic material. In the present embodiment, the sensor body 3 is formed from ethylene propylene diene monomer (EPDM). Further elastomeric materials are conceivable and may be selected depending on the particular application and aggressive media.

The first surface 4 and the second surface 5 of the sensor body 3 are coated so as to be electrically conductive, wherein the coating is in each case selected such that the first surface 4 and the second surface 5 of the sensor body 3 are coated so as to be electrically conductive over their entire surface. The electrically conductive coating may, for example, be vapor-deposited on the first surface 4 and the second surface 5. However, the coating may also take the form of a lacquer with electrically conductive particles.

The sensor body 3 has a measuring segment 6 and a fastening segment 7. The layer thickness of the fastening segment 7 is thereby greater than the layer thickness of the measuring segment 6.

The electrically conductive first surface 4 and the electrically conductive second surface 5 form plates of a plate capacitor, wherein the capacitance of the plate capacitor substantially results from the distance between the two surfaces 4, 5. Due to the elastic design of the sensor body 3, said sensor body 3 deforms when the pressure of a first chamber acts on the first surface 4 and the pressure of a second chamber acts on the second surface 5, wherein the pressure of the first chamber differs from the pressure of the second chamber. If there is a pressure difference between the two, the measuring segment 6 will bulge in the direction of the chamber with lower pressure, wherein the measuring segment 6 of the sensor body 3 deforms, and wherein at the same time the distance between the first surface 4 and the second surface 5 changes, which is accompanied by a change in the capacitance of the plate capacitor. By measuring the capacitance of the plate capacitor, the pressure difference of the two pressures acting on the sensor body 3 can thereby be determined.

The layer thickness of the fastening segment 7 is thereby selected such that this region has a reduced offset capacitance and thereby does not significantly, in particular does not noticeably, influence the change in capacitance determined in the measuring segment 6. For this purpose, the layer thickness of the fastening segment 7 in the present embodiments is three times greater than the layer thickness of the measuring segment 6. The layer thickness of the measuring segment 6 is 0.5 mm.

FIG. 1 shows a first embodiment of the sensor element 1. Here the sensor body 3 is of a disciform design and has an axial flange 8. The supporting body 2 is tubular, and the axial flange 8 of the sensor body 3 comes to rest on the outer circumference of the tubular supporting body 2. The supporting body 2 and the sensor body 3 are thereby connected to each other by positive locking.

The axial flange 8 of the sensor body 3 has an at least partially circumferential positive-locking element 9 on the inner circumferential side. In the present embodiment, as viewed in section this is semicircular in shape and surrounds the inner circumference of the axial flange 8.

The supporting body 2 has on its outer circumference a recess 10 which is congruent with the positive-locking element 9 of the sensor body 3. For this purpose, the supporting body 2 on its outer circumference has a circumferential, semicircular recess 10 in the form of a groove. The positive-locking element 9 of the axial flange 8 engages in the recess 10.

Figure 2:
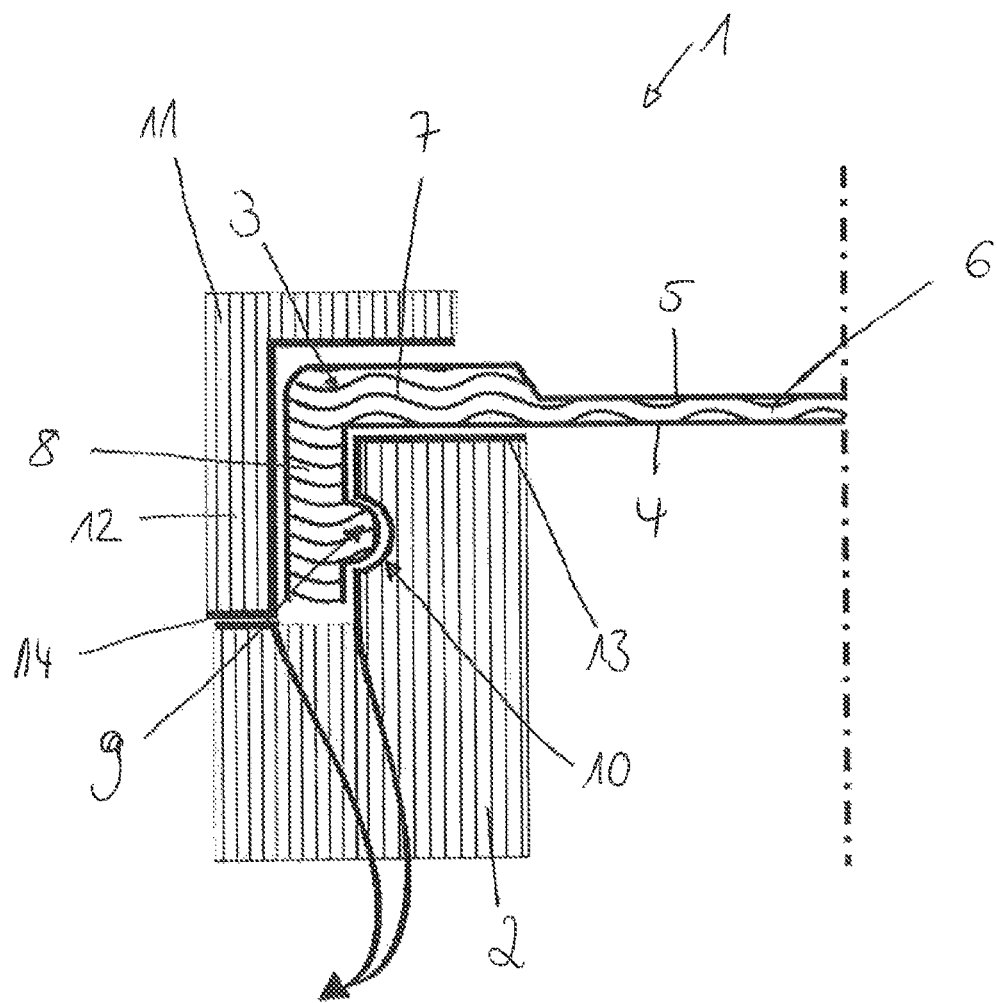
FIG. 2 an additional sensor element with closure body.

FIG. 2 shows a development of the sensor element 1 shown in FIG. 1. In the present embodiment, the sensor body 3 is arranged between the supporting body 2 and a closure body 11, wherein the closure body 11 is annular and has a second axial flange 12. The second axial flange 12 extends on the outer circumference over the axial flange 8 of the sensor body 3, and thus locks the sensor body 3 between the supporting body 2 and the closure body 11.

The supporting body 2 is equipped with a contact element 13 for an electrical contact with the electrically conductive first surface 4. The closure body 11 is equipped with a further contact element 14 for an electrically conductive contact with the electrically conductive second surface 5 of the sensor body 3. Both contact elements 13, 14 have connecting means for receiving cables for an electrical contact with a measuring device.

Figure 3:
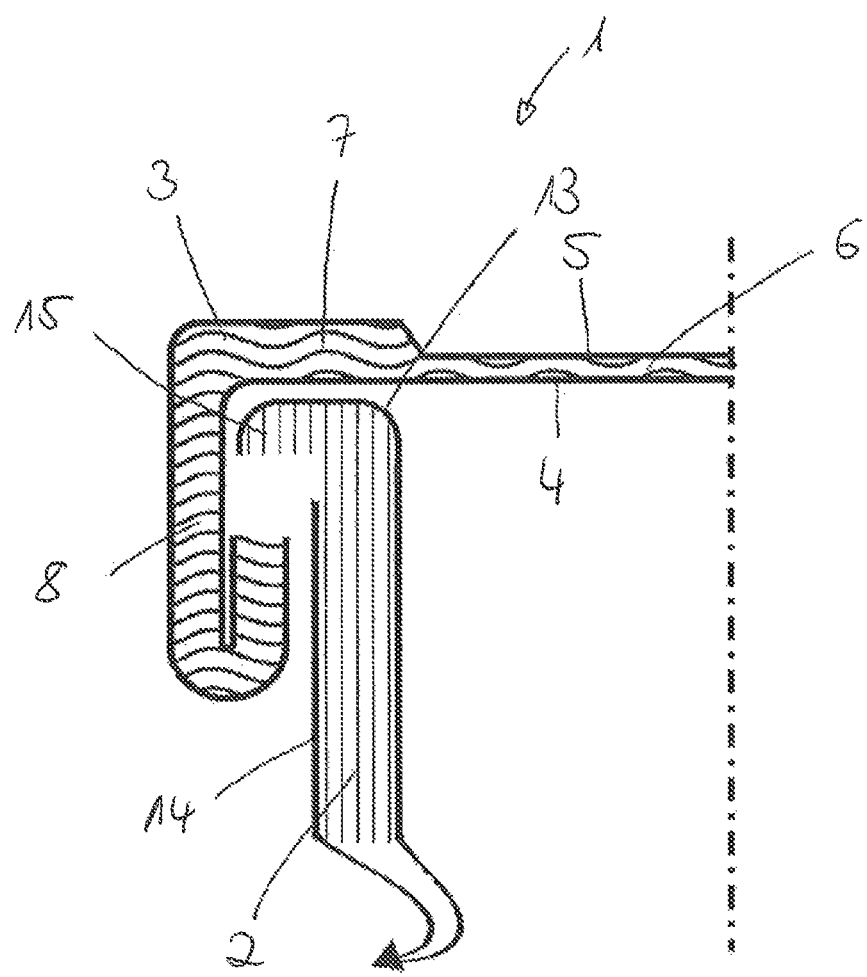
FIG. 3 a sensor element having a supporting body with radial flange.

FIG. 3 shows a sensor element 1 in which the axial flange 8 of the sensor body 3 is bent in a U-shape at the free end. The supporting body 2 in turn has a radial flange 15 at the edge associated with the sensor body 3, which radial flange 15 the U-shaped bent segment of the axial flange 8 of the sensor body 3 encompasses in order thus to be locked onto the supporting body 2 by positive locking.

On the side facing the sensor body 3, the radial flange 15 of the supporting body 2 has a contact element 13 for electrically conductive contact with the electrically conductive first surface 4 of the sensor body 3. The supporting body 2 also has an additional contact element 14 which is arranged on the outer circumference of the tubular segment of the supporting body 2. The additional contact element 14 thereby contacts the U-shaped bent segment of the axial flange 8 of the sensor body 3, wherein the electrically conductive second surface 5 of the sensor body 3 comes to rest on the additional contact element 14. Both contact elements 13, 14 have connecting means for receiving cables for an electrical contact with a measuring device.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C

What is claimed is:

1. A sensor element, comprising:
   a supporting body; and
   a sensor body, the sensor body being planar in shape, comprising an elastic material, and having a first surface and a second surface coated so as to be electrically conductive,
   wherein the first surface is electrically isolated from the second surface,
   wherein the sensor body comprises a measuring segment and a fastening segment, and
   wherein a layer thickness of the fastening segment is greater than a layer thickness of the measuring segment.

2. The sensor element according to claim 1, wherein the first surface and the second surface of the sensor body are coated so as to be electrically conductive over an entire surface thereof.

3. The sensor element according to claim 1, wherein the supporting body and the sensor body are connected to each other by positive locking.

4. The sensor element according to claim 1, wherein the sensor body comprises a disciform design and has an axial flange.

5. The sensor element according to claim 4, wherein the supporting body is tubular in shape.

6. The sensor element according to claim 5, wherein the axial flange of the sensor body comes to rest on an outer circumference of the tubular supporting body.

7. The sensor element according to claim 1, wherein the sensor body has an at least partially circumferential positive-locking element in a region of the fastening segment on a side thereof facing the supporting body.

8. The sensor element according to claim 7, wherein the supporting body has, on a side thereof facing the fastening segment of the sensor body, a recess which is formed to be complementary to the positive-locking element of the sensor body.

9. The sensor element according to claim 1, wherein the sensor body is arranged between the supporting body and a closure body, and wherein the closure body comprises an annular design.

10. The sensor element according to claim 1, wherein the supporting body comprises at least one contact element configured to electrically conductively contact the electrically conductive first surface or the electrically conductive second surface of the sensor body.

11. The sensor element according to claim 9, wherein the closure body comprises at least one additional contact element configured to electrically conductively contact the electrically conductive first surface or the electrically conductive second surface of the sensor body.

* * * * *